United States Patent [19]

Rogers

[11] 4,178,072
[45] Dec. 11, 1979

[54] OPTICAL SYSTEMS

[75] Inventor: Philip J. Rogers, Meliden, Wales

[73] Assignee: Pilkington P. E. Limited, Merseyside, England

[21] Appl. No.: 855,628

[22] Filed: Nov. 29, 1977

Related U.S. Application Data

[63] Continuation-in-part of Ser. No. 687,876, May 19, 1976, abandoned.

[30] Foreign Application Priority Data

Jun. 7, 1975 [GB] United Kingdom ............... 24654/75
Dec. 2, 1976 [GB] United Kingdom ............... 50242/76

[51] Int. Cl.$^2$ ............................................. G02B 27/02
[52] U.S. Cl. .................................... 350/145; 350/172; 350/173
[58] Field of Search ....................... 350/25, 33, 35, 48, 350/50, 145, 172, 173, 245

[56] References Cited

U.S. PATENT DOCUMENTS

| 1,240,905 | 9/1917 | Troppman | 350/145 |
| 1,497,356 | 6/1924 | Comstock | 350/173 |
| 1,806,621 | 5/1931 | Forrest | 350/33 X |
| 3,936,152 | 2/1976 | Aurin et al. | 350/35 X |

FOREIGN PATENT DOCUMENTS

| 520112 | 3/1955 | Italy | 350/173 |
| 394118 | 6/1933 | United Kingdom | 350/48 |

Primary Examiner—John K. Corbin
Assistant Examiner—Matthew W. Koren
Attorney, Agent, or Firm—Mattern, Ware, Davis & Stoltz

[57] ABSTRACT

Apparatus for biocular viewing comprises a collimating magnifier lens and a prismatic assembly providing inclined partially transmitting/partially reflecting interfaces between solid parts and reflecting faces parallel to the interfaces which give multiple light paths by which an observer can view with each eye a magnified image produced by the lens.

45 Claims, 16 Drawing Figures

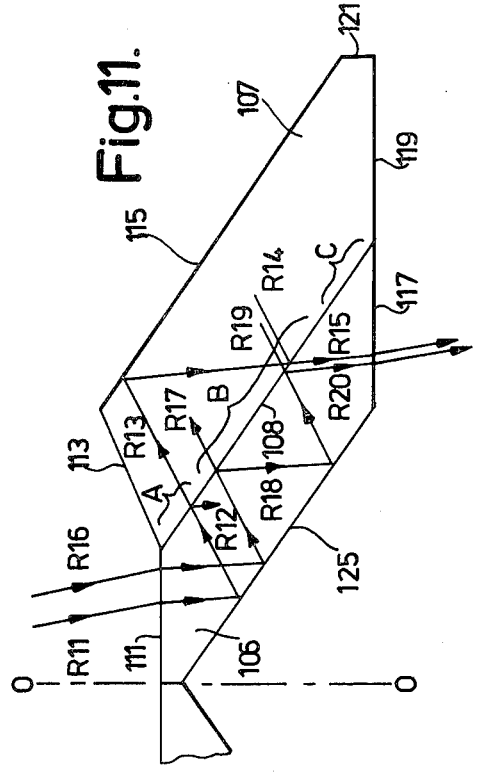
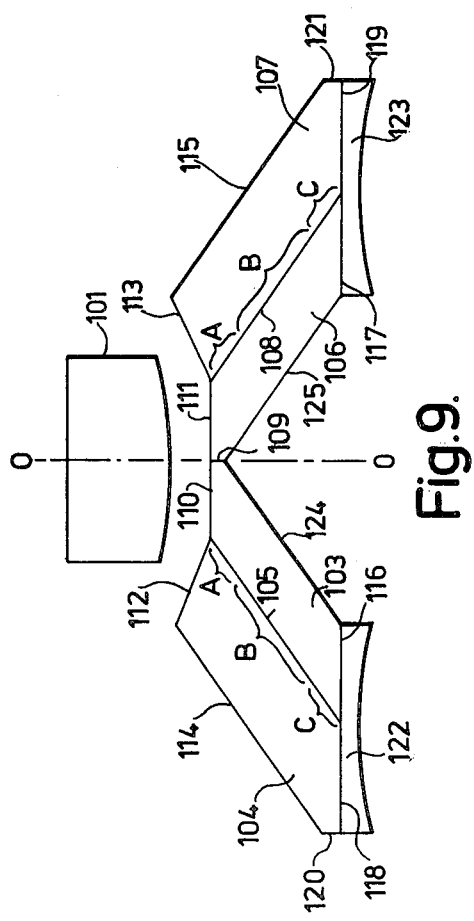
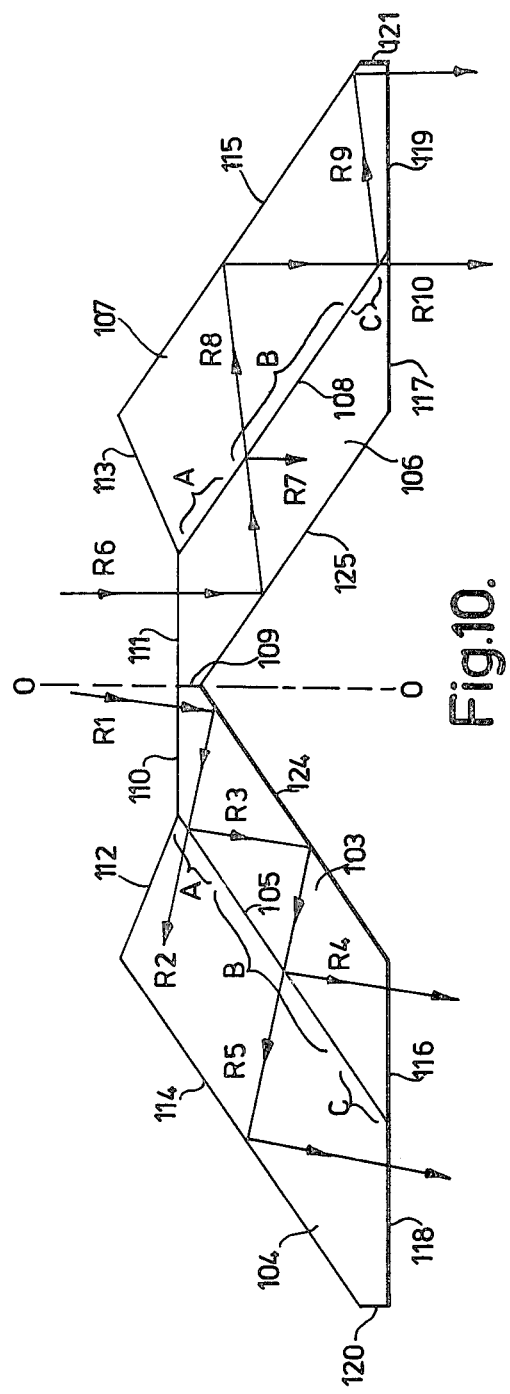

OPTICAL SYSTEMS

RELATED APPLICATIONS

This application is a Continuation-in-Part of my U.S. Patent application Ser. No. 687,876, filed May 19, 1976, now abandoned, for IMPROVEMENTS IN OR RELATING TO OPTICAL SYSTEMS.

This invention concerns improvements in or relating to optical systems and more particularly relates to optical apparatus for biocular viewing.

In previously proposed biocular viewing devices enabling an observer to view with both eyes a magnified image of an object the intrinsic magnifying power has generally been limited in that the focal length necessary to achieve high magnification tends to create a numerical aperture which is greater than the maximum that can be achieved in free air, i.e. 1.0, if the device is to be of reasonable width.

According to the present invention there is provided an optical apparatus for biocular viewing comprising a collimating magnifier lens for producing a magnified image of an object to be viewed and having an optical axis, and means positioned to receive light from the lens and providing a pair of partially transmitting/partially reflecting interfaces between solid parts, the interfaces being disposed respectively on opposite sides of and inclined relative to the optical axis so as to converse in a direction towards the lens, and further providing a pair of reflecting faces located respectively on opposite sides of the optical axis and each positioned further from the optical axis than the partially transmitting/partially reflecting interfaces on that side, each said reflecting face being parallel to the partially transmitting/partially reflecting interface on the same side of the optical axis and disposed so as to reflect rays of light received from the lens via the partially transmitting/partially reflecting interface towards an observer in parallel relationship with rays of light received from the lens and travelling from the partially transmitting/partially reflecting interface towards the observer thereby to provide on each side of the optical axis plural light paths by which said image can be viewed.

The lens may be of relatively short focal length, for example of the order of 25 mm.

Said reflecting faces are preferably totally reflecting and may be rendered such by the application of a totally reflecting coating. The partially transmitting/partially reflecting interfaces may have a coating of suitable transmission/reflection characteristics applied thereto.

The said faces and interfaces are conveniently provided by a prismatic assembly and said means may in particular comprise at least one pair of rhomboidal prisms opposed faces of which provide said faces and interfaces. The term "rhomboidal" when used herein is to be understood (as commonly applied in the art) as not being limited to (but not excluding) a six faced solid figure whose faces are parallelograms having sides of equal length. The term thus includes, for example, a parallelepiped having opposite edges with acute included angles and having faces which are parallelograms and whose adjacent sides are of unequal length.

A pair of rhomboidal prisms may be disposed respectively on opposite sides of the optical axis with a triangular prism therebetween, the interfaces between the triangular prism and the inner faces (closest to the axis) of the rhomboidal prisms being partially transmitting/partially reflecting, and the outer faces (furthest from the axis) of the rhomboidal prisms preferably being totally reflecting.

Alternatively two pairs of rhomboidal prisms may be disposed to locate two prisms to one side and two to the other side of the optical axis, the two prisms on each side of the optical axis being cemented together, and the cemented interfaces being partially transmitting/partially reflecting, and the outer faces of the outer prisms (i.e. the faces furthest from the optical axis) preferably being totally reflecting. The inner faces of the inner prisms (i.e. the faces closest to the optical axis) may be totally reflecting, or may have a triangular prism disposed therebetween, the interfaces between the triangular prism and said inner prisms being partially transmitting/partially reflecting.

Where a triangular prism is included between rhomboidal prisms, a mask is preferably disposed along the optical axis centrally of the triangular prism.

Adjacent prisms on opposite sides of the optical axis are preferably disposed with acute apexes nominally touching the optical axis. However, in practice the apexes may be chamferred and the prisms disposed with the chamfers nominally touching the optical axis. Preferably the faces of the adjacent prisms facing the lens lie in the same plane so that the acute apexes (or chamfers) nominally touching the optical axis are contiguous.

Plano-concave lenses may be associated with e.g. cemented to, the output faces of the rhomboidal prisms. The non-used faces of the rhomboidal prisms are preferably ground and blackened.

The apparatus may include means to bend the light path and in particular may include a light bending prism disposed in the light path between lens components of the collimating magnifier lens and arranged to produce one or more bends in the light path through the lens.

In a modified version of the optical apparatus in accordance with the present invention each of the said partially transmitting/partially reflecting interfaces has different transmission/reflection characteristics over different parts of the interface.

More particularly, each interface may have a higher reflection/transmission ratio at a part of the interface located towards said collimating magnifier lens than at a part of the interface located when in use towards the observer. Thus, where said means providing said interfaces and said reflecting faces has an input face, through which light from the lens enters, and an output face, through which light emerges, each interface may have a higher reflection/transmission ratio over a part located towards said input face than over a part located towards said output face.

Preferably each interface has three zones of different reflection/transmission characteristics, namely a first zone located towards said input face and having a relatively high reflection/transmission ration, a second zone located adjacent said first zone and having a medium reflection/transmission ration, and a third zone located adjacent said second zone and towards said output face and having a relatively low reflection/transmission ratio. For example, the first zone may effect a 75% reflection and a 25% transmission, the second zone may effect a 50% reflection and a 50% transmission, and the third zone may effect a 25% reflection and a 75% transmission, or may effect 100% transmission.

The different zones may be provided by a multiple coating operation, but may more conveniently be provided by a single coating operation employing a mask having an arrangement of apertures which defines different areas over which suitable coating material is applied to achieve different clear to coated area ratios at locations corresponding to the respective zones, the actual coated areas having the same reflection/transmission ratio but the different zones having different overall reflection/transmission ratios because of the different coated/uncoated area ratios. The coated areas may, for example, take the form of bands of different widths and/or at different spacings in the respective zones, but preferably the coated areas take the form of shapes, such as circles, which are randomly distributed (but so as to give the required coated to uncoated area ratios in the respective zones) in order to avoid possible problems arising from diffraction effects. One of the zones may be wholly coated and the other two partially coated, the coated areas then having the reflection/transmission ratio required for said one zone and said other two zones being partially masked during the coating operation to achieve respective coated to uncoated area ratios which give the required overall reflection/transmission ratios for those zones. Alternatively, where one of the zones is to be totally transmissive, that zone may be completely masked so as to remain wholly uncoated while one of the other zones is wholly coated and the other is partially coated. As a further alternative, a two stage coating operation may be employed in which in one stage one zone is wholly coated and in the other stage a mask is applied which wholly covers said one zone and partially covers another zone so that said other zone becomes partially coated and the remaining zone becomes wholly coated. In this case the coating applied in said one stage is such as to give the required reflection/transmission ratio in said one zone and the coating applied in said other stage is such as to give the required reflection/transmission ratio in said remaining zone (said other zone acquiring its required reflection/transmission ratio from its coated to uncoated area ratio). As a yet further alternative, a two stage coating operation may be employed which in one stage wholly coats a first zone, the other two being completely masked, and in the other stage wholly coats a second zone, the other two being completely masked, so that the third zone is completely masked during both stages and thus remains wholly uncoated so as to be totally transmissive.

The apparatus preferably includes two reflecting faces on each side of the optical axis, the respective interface being positioned between and parallel to the reflecting faces on that side, and preferably the spacing between the interface and the reflecting face furthest from the optical axis is greater than that between the interface and the reflecting face nearest the optical axis. Preferably the reflecting faces furthest from the optical axis extend in a direction towards the lens beyond a plane orthogonal to the optical axis and intersecting the ends of the interfaces closest to the lens.

Conveniently the means providing the partially transmitting/partially reflecting interfaces and the reflecting faces may comprise a prismatic assembly and in particular an assembly of prisms which are basically rhomboidal in form, but which may have chamferred corners.

The term 'rhomboidal prism' where used herein is to be understood (as commonly applied in the art) to mean a prism substantially of parallelepiped form having two opposed faces which are in essence non-rectangular parallelograms and which may or may not be equilateral parallelograms. As will be apparent, some departure from this exact form, e.g. by way of chamferred corners and/or otherwise, may be tolerated or indeed desirable and the term 'basically rhomboidal prism' is to be construed accordingly.

In a preferred embodiment there are provided two pairs of basically rhomboidal prisms disposed with two prisms to one side and two to the other side of the optical axis, the two prisms on each side of the optical axis being cemented together and the cemented interfaces providing said partially transmitting/partially reflecting interfaces, the inner faces of the inner prisms (i.e. the faces closest to the optical axis) and the outer faces of the outer prisms (i.e. the faces furthest from the optical axis) being totally internally reflecting and providing said reflecting faces. The inner prisms preferably have their end faces closest to the lens, which provide input faces through which light from the lens enters the prisms, in co-planar disposition orthogonal to the optical axis, but preferably the outer prisms have their end faces closest to the lens inclined relatively to such input faces so that the outer (totally reflecting) faces of the outer prisms extend in a direction towards the lens beyond the plane of the input faces. The inner prisms may be disposed with acute apexes nominally touching the optical axis but preferably the apexes are chamferred and the prisms disposed with the chamfers nominally touching the optical axis. The outer prisms may have their acute apex corners furthest from the optical axis also chamferred. The inner prisms are preferably narrower than (i.e. have a width dimension orthogonal to the optical axis less than that of) the outer prisms.

The end faces furthest from the lens of the inner and outer prisms, which provide output faces through which light emerges, are preferably disposed in coplanar relationship orthogonal to the optical axis, and plano-concave lenses are preferably associated with the respective output faces on each side of the optical axis. Such lenses may, for example, be cemented to the respective output faces or cemented to wedge shaped prisms which are cemented to the respective output faces. The non-used faces of the prisms are preferably ground and blackened.

In order that the invention may be more clearly understood reference is now directed to the accompanying drawings given by way of example in which:-

Figure 2:
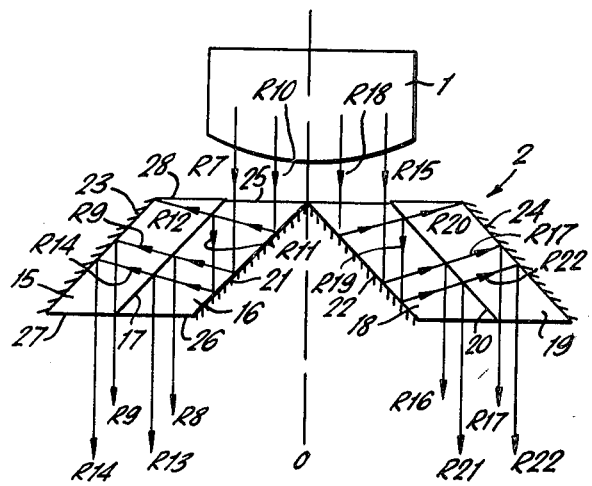
FIG. 2 is a schematic representation of a second embodiment.
Figure 3:
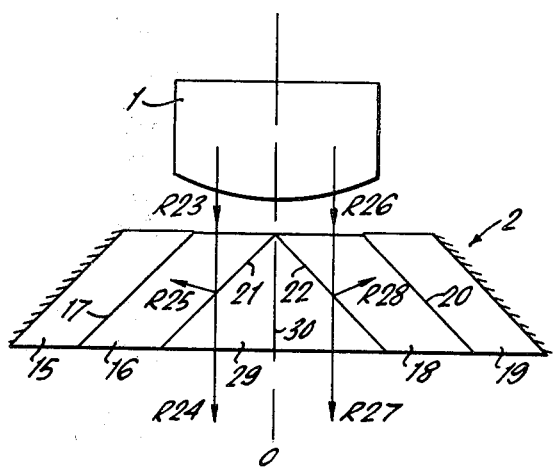
FIG. 3 is a schematic representation of a third embodiment.
Figure 4A:
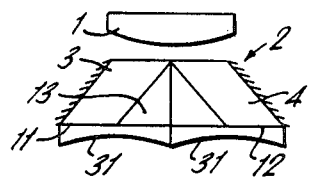
Figure 4B:
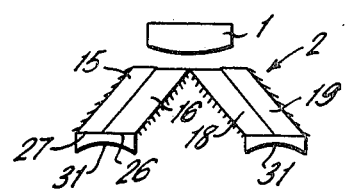
Figure 4C:
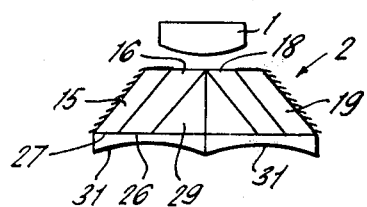
Figure 5:
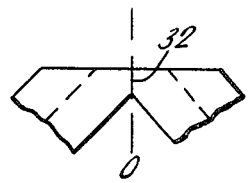
Figure 6:
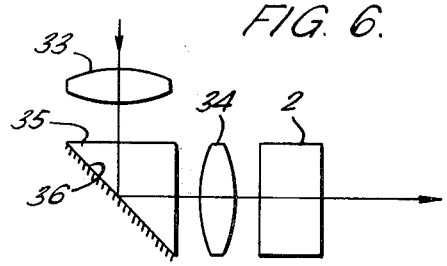
Figure 7:
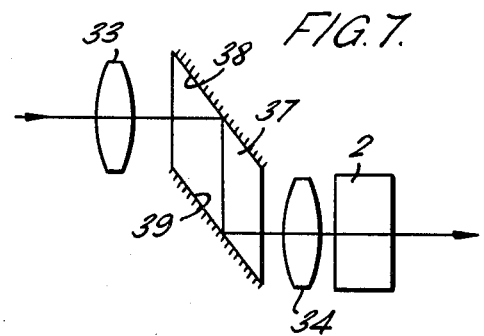
Figure 8:
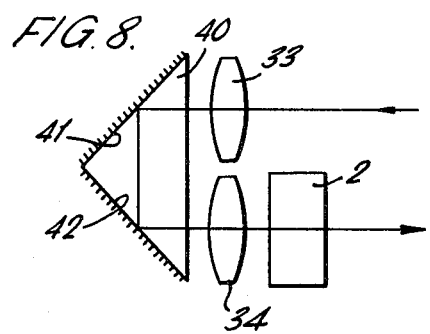
Figure 12:
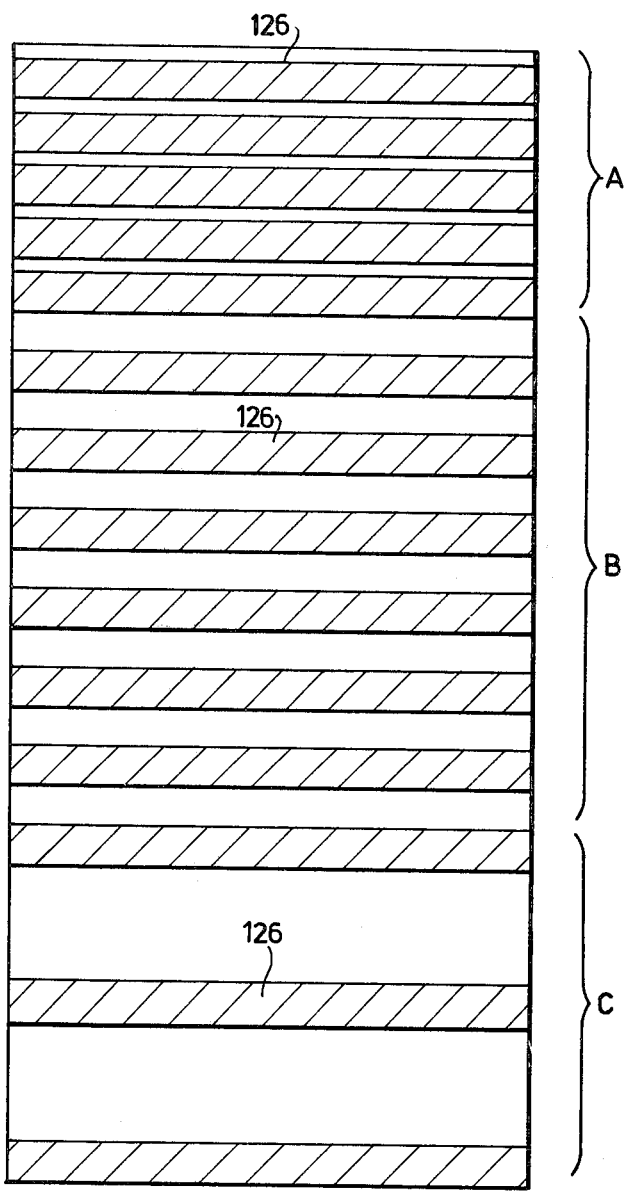
Figure 13:
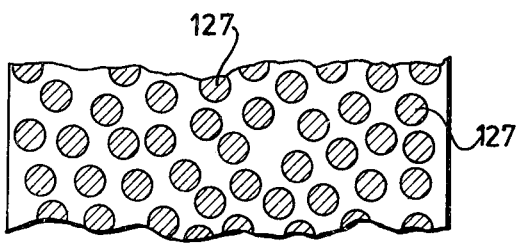
Figure 14:
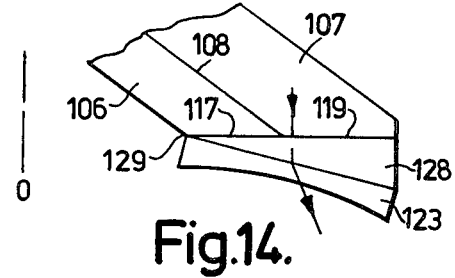

FIGS. 4A, 4B and 4C show a modification applied to the embodiments of FIGS. 1, 2 and 3, FIG. 5 shows a further modification, and FIGS. 6, 7 and 8 show arrangements for bending the light path, FIG. 9 is a schematic representation of a preferred embodiment, FIG. 10 is an enlarged view of part of FIG. 9 showing illustrative light paths, FIG. 11 is a view similar to part of FIG. 10 showing further illustrative light paths, FIG. 12 is a schematic view of a partially transmitting/partially reflecting interface, FIG. 13 is a schematic view of part of another form of partially transmitting/partially reflecting interface, and FIG. 14 is a schematic representation of a modification to the embodiment of FIG. 9.

Figure 1:
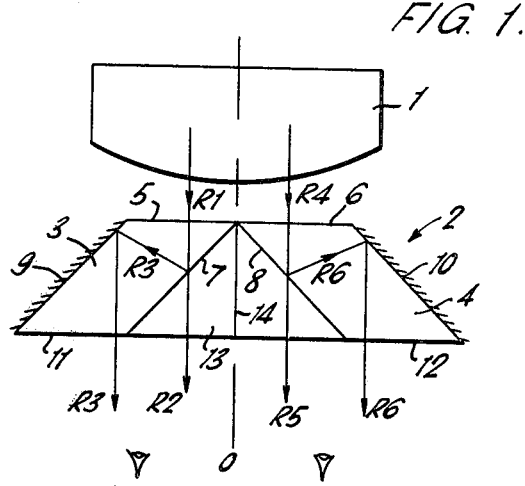
FIG. 1 is a schematic representation of a first embodiment.

The embodiment shown in FIG. 1 comprises a collimating magnifier lens 1 having an optical axis 0. Disposed in front of the lens is a prism arrangement 2 comprising a pair of rhomboidal prisms 3 and 4 disposed on opposite sides of the axis 0 with their acute apexes nearest the lens contiguous and touching the optical axis, and their faces 5 and 6 facing the lens coplanar and normal to the optical axis. The inner faces 7 and 8 inclined to the optical axis and converging in a direction towards the lens 1 have a partially transmitting/partially reflecting coating while the outer faces 9 and 10 parallel to the faces 7 and 8 respectively have a totally reflecting coating.

The triangular space between the faces 7 and 8 is occupied by a triangular prism 13 which is cemented to the prisms 3 and 4. There are thus provided partially transmitting/partially reflecting interfaces between solid parts, i.e. between the triangular prism 13 and the rhomboidal prisms 3 and 4, all of these prisms being of glass having the same refractive index. A mask 14 may be provided centrally of the prism 13 and lying along the optical axis in order to prevent ghost images of any bright objects positioned immediately behind the observer being reflected into his eyes.

With this arrangement light emerging from the lens 1 enters the prisms 3 and 4 and some of the light is transmitted through the respective inner faces 7 and 8 while other light is reflected by these faces towards the outer faces 9 and 10 respectively to be reflected thereby. As a specific example a ray of light R1 emerging from the lens to one side of and parallel to the optical axis 0 enters the prism 3 at normal incidence through the face 5 and is then incident on the face 7. The ray is effectively split at the face 7 into a transmitted ray R2, which continues parallel to the axis 0, and a reflected ray R3 which travels towards the face 9. The ray R3 is totally reflected at the face 9 to strike the face 11 (parallel to the face 5) at normal incidence and emerge from the prism travelling parallel to the ray R2. A ray R4 emerging from the lens 1 on the opposite side of and parallel to the optical axis in similar fashion enters the prism 4 through the face 6 and is split into a ray R5 transmitted through the face 8 and a ray R6 produced by reflection at the face 8 and then reflected from the face 10 to emerge through the face 12.

It will be seen that each eye of a biocular observer can view a magnified infinity image given by the lens 1 by direct view through the respective prism face 7 or 8 (as illustrated by the rays R2 and R5), and/or by indirect view via the respective prism faces 9 or 10 and 7 or 8 (as illustrated by the rays R3 and R6).

In the embodiment of FIG. 2 the prism arrangement 2 in front of the lens 1 comprises two pairs of rhomboidal prisms of glass of the same refractive index. The two prisms 15 and 16 to one side of the optical axis are cemented together at an interface 17, and the two prisms 18 and 19 on the opposite side of the axis are similarly cemented together at an interface 20. The composite prisms 15/16 and 18/19 thus formed are located in essentially the same disposition with respect to the lens 1 as the respective prisms 3 and 4 of FIG. 1. Partially transmitting/partially reflecting coatings are provided at the interfaces 17 and 20 (being applied in particular to the inner faces of the outer prisms 15 and 19). The inner prism faces 21 and 22 and the outer prism faces 23 and 24 have totally reflecting coatings.

The faces of the outer prisms 15 and 19 directed towards the lens 1, i.e. face 28 of the prism 15 and the corresponding face of the prism 19, are ground and blackened to prevent reflection.

With this arrangement there are multiple light paths by which light emerging from the lens 1 can be directed by the prism arrangement 2 towards an observer. For example, a ray of light R7 emerging from the lens on one side of and parallel to the optical axis 0 and entering the prism 16 at normal incidence through its face 25 is totally reflected at the face 21 towards the interface 17. At the interface the ray is effectively split into a reflected ray R8, which emerges through the face 26 of the prism 16, and a transmitted ray R9 which is totally reflected by face 23 to emerge through the face 27 of the prism 15. A ray R10 emerging from the lens 1 parallel to the optical axis and entering the prism 16 at normal incidence through its face 25, but at a point closer to the optical axis than the entry point of ray R7, is totally reflected at the face 21 towards the interface 17. At the interface the ray is effectively split into a reflected ray R11 which is redirected back onto face 21, and a transmitted ray R12 which is absorbed, however, at the ground and blackened face 28. Ray R11 is re-reflected totally at face 21 back towards the interface where it is effectively split into a reflected ray R13 which emerges through the face 26 of the prism 16, and a transmitted ray R14 which is totally reflected by face 23 to emerge through the face 26 of the prism 16, and a transmitted ray R14 which is totally reflected by face 23 to emerge through the face 27 of the prism 15. Corresponding rays R15 and R18 emerging from the lens 1 on the opposite side of the optical axis are similarly directed in the composite prism 18/19 to emerge therefrom as rays R16, R17, R21 and R22.

In addition to the light paths specifically mentioned above, there are further multiple reflection and transmission paths and a biocular observer can view with each eye the magnified infinity image given by the lens 1 via all of these light paths.

The embodiment of FIG. 3 is basically similar to that of FIG. 2 except that the inner prism faces 21 and 22 have a coating which is partially transmitting/partially reflecting (as distinct from the totally reflecting coating of the FIG. 2 embodiment), and the space between the faces 21 and 22 is filled with a triangular prism 29 (of glass of the same refractive index as the prisms 16 and 18 to which it is cemented) and provided with a mask 30 as already described in relation to FIG. 1. With this arrangement a light ray R23 (equivalent to the ray R7 in FIG. 2) is effectively split at the face 21 (which provides a partially transmitting/partially reflecting interface between solid parts) into a transmitted ray R24, which continues its travels parallel to the optical axis towards an observer, and a reflected ray R25 which travels towards the interface 17 to be partially transmitted and partially reflected as already described with reference to the ray R7 of FIG. 2. A ray R26 (corresponding to ray R15 of FIG. 2) is similarly effectively split at the face 22 (which provides a partially transmitting/partially reflecting interface between solid parts) into a transmitted ray R27 and a reflected ray R28.

A device in accordance with the invention can, for example, incorporate a collimating magnifier lens 1 of approximately 10 times magnification but of numerical aperture less than 1.0, the prism arrangement 2 providing an effective width sufficient for biocular viewing, e.g. of about 80 mm, by giving a composite view of all of the magnified image of an object being viewed through the lens as described above. This compares favourably with previous biocular viewing devices having a maximum intrinsic magnifying power of about 5.5 times because the focal length necessary to achieve this magnification creates a numerical aperture for the device that approaches 1.0 for a reasonable magnifier width of about 80 mm.

The lens 1 may be of relatively short focal length, for example of the order of 25 mm.

The embodiments shown in FIGS. 1, 2 and 3, when having a prism arrangement 2 of width about 80 mm, can provide eye reliefs (defined as the maximum distance at which the full field of view can be seen), equal to or in excess of that provided by more conventional beam splitter, relay lens and eyepiece binocular systems. For the embodiments of FIG. 1 and 3 the eye relief can be up to 80 mm or more (although this will generally be reduced if a mask 14 or 30 is employed) and for the FIG. 2 embodiment the eye relief can be typically about 35 mm (it being understood that the eye relief is also dependent on the field of view given by the magnifier lens 1).

The embodiments shown give some apparent attenuation of the viewed image due to the multi-viewing paths. This attenuation is greatest for the FIG. 3 embodiment but can be counteracted in, for example, a night vision device by employing a high gain intensifier tube.

The collimating accuracy required from the collimating magnifier lens 1 is generally approximately 0.5 milliradians, this being required so that there is no "jump" in image position as the eye begins to view it via a different path through the prism arrangement 2.

In order to situate the final image given by the whole lens/prism system at a convenient distance from the observer, a pair of low power plano-concave lenses (of suitably chosen thickness) can be cemented onto the output faces of the prisms. This is illustrated relative to the FIG. 1, 2 and 3 embodiments in FIGS. 4A, 4B and 4C respectively which show plano-concave lenses 31 cemented to the coplanar output faces of the respective prisms. Thus FIG. 4A shows a lens 31 cemented to the face 11 of the prism 3 and a similar lens 31 cemented to the face 12 of the prism 4, the lenses 31 extending across the triangular prism 13 as shown. FIG. 4B shows a lens 31 cemented to the co-planar faces 26 and 27 of the prisms 15 and 16, and a similar lens 31 cemented to the corresponding co-planar faces of the prisms 18 and 19. FIG. 4C shows a lens 31 cemented to the output faces of the prisms 15 and 16, and a similar lens 31 cemented to the output faces of the prisms 18 and 19, the lenses 31 in this case extending across the triangular prism 29 as shown. The plano-concave lenses 31 are preferably cemented on to the prisms in order to alleviate problems due to "ghost" images.

The rhomboidal prisms may conveniently have apex angles of 35° and 145° although other angles may be chosen provided consideration is given to possible "ghost" image problems.

It is very desirable to grind and blacken the non-used faces of the prisms in order to avoid visible ghost images. In situations where rearward placed bright lights can be internally reflected in the prisms it is further desirable to provide eye-guards.

If desired, the adjacent prism apexes may be heavily chamferred so that the prisms can effectively be placed closer together thereby reducing the required magnifying collimator lens diameter. This is illustrated in FIG. 5 which shows chamfers 32 where the prisms meet on the optical axis 0.

Generally, it is desirable that the lens 1 is a little wider than the prism input faces in order to avoid "blind spots" in the skew field of views. The lens should also have relatively little vignetting to prevent wide illumination variations occurring in the field of view.

The maximum field of view of the system is essentially limited by the maximum achievable aperture of the magnifier collimator lens and can, for example, be in excess of 60 degrees. The FIG. 3 embodiment enables the largest field of view to be achieved (but also gives the largest image brightness attenuation).

If desired, the system may embody one or more bends, which may be situated in the magnifier collimator lens as illustrated in FIGS. 6, 7 and 8 by way of example.

In FIG. 6 the magnifier collimator lens comprises two lens components 33 and 34 with a 45 degree, 90 degree, 45 degree prism 35 located between them, the prism having a totally reflecting face 36 which bends the light path through 90 degrees in well known manner. The light emerging from the lens component 34 is then received by the prism arrangement 2.

In FIG. 7 a rhomboidal prism 37 having totally reflecting opposite faces 38 and 39 is interposed between the lens components 33 and 34 to cause a double bend in the light path effectively resulting in a sideways shift.

In FIG. 8 a 45 degree, 90 degree, 45 degree prism 40 in the light path between the lens components 33 and 34 and with totally reflecting faces 41 and 42 causes a double bend effectively resulting in a reversal of light travel direction with a sideways shift.

Referring to FIG. 9, the apparatus comprises a collimating magnifer lens 101 having an optical axis 0. Disposed in front of the lens is a prism arrangement or assembly comprising two pairs of basically rhomboidal prisms of glass of the same refractive index. The two prisms 103 and 104 to one side of the optical axis are cemented together at an interface 105, and the two prisms 106 and 107 on the opposite side of the axis are similarly cemented together at an interface 108.

The composite prisms 103/104 and 106/107 thus formed are disposed symmetrically with respect to the optical axis 0, the acute apex corners of the inner prisms 103 and 106 being chamferred and the chamfers 109 nominally touching the optical axis and preferably being cemented together. The end faces 110 and 111 closest to the lens 101 of the inner prisms 103 and 106 lie in co-planar disposition orthogonal to the axis 0 and provide an input face through which light from the lens 101 enters the prisms. The end faces 112 and 113 closest to the lens 101 of the outer prisms 104 and 107 are inclined relative to the faces 101 and 111 so that the outer side faces 114 and 115 of the outer prisms extend in a direction towards the lens beyond the plane occupied by the faces 110 and 111.

The end faces furthest from the lens 101 of the inner and outer prisms, i.e. the end faces 116 and 117 of the inner prisms 103 and 106 and the end faces 118 and 119 of the outer prisms 104 and 107, lie in co-planar disposition orthogonal to the axix 0 and provide output faces through which light emerges from the prisms. The free acute apex corners of the outer prisms are chamferred as indicated at 120 and 121. Concave-plano lenses 122 and 123 are cemented to the respective output faces 116/118 and 117/119.

The interfaces 105 and 108 are partially transmitting/partially reflecting as more fully described below. The outer faces 114 and 115 of the outer prisms 104 and 107 and the inner faces 124 and 125 of the inner prisms 103 and 106 are totally internally reflecting, being rendered such by the application of a suitable coating thereto. The non-used faces of the prisms are ground and blackened, including the faces 112 and 113 which do not receive light from the lens 101 and effect no transmission or reflection.

The inner prisms 103 and 106 are narrower than the outer prisms 104 and 107, i.e. the width dimension (in a direction orthogonal to the optical axis 0) of the inner prisms is less than that of the outer prisms.

The above described arrangement thus provides partially transmitting/partially reflecting interfaces 105 and 108 on opposite sides of the optical axis 0 and inclined relatively thereto so as to converge towards the lens 101, each interface being positioned between totally reflecting faces (114 and 124 for the interface 105 and 115 and 125 for the interface 108) extending parallel to the interface. The inner prisms 103 and 106 are rhomboidal in form but with a chamferred corner 109, and the prisms 104 and 107 are also basically rhomboidal in form but with chamferred corners 120 and 121 and effectively with extended side faces 114 and 115 which cause the end faces 112 and 113 to be slightly inclined relative to the end faces 118 and 119. The apex angles of the basic rhomboids may, for example, be 35° and 145°.

With such an arrangement an observer viewing through the lenses 122 and 123 can see with each eye the magnified infinity image given by the collimating magnifier lens 101 by receipt of light reflected from the faces 114 and 115 in parallel relationship with light from the partially transmitting/partially reflecting interfaces 105 and 108 essentially as described above.

In accordance with an aspect of the present invention the interfaces 105 and 108 have different transmission/reflection characteristics over different parts of the interface. Each interface effectively has three zones of different reflection/transmission ratios, namely a first zone A over the part of the interface towards the input face 110/111, an adjacent second zone B over the central part of the interface, and a third zone C over the part of the interface towards the output faces 116/118 and 117/119 respectively. The first zone A has a relatively high reflection/transmission ratio, for example a reflection of 75% and a transmission of 25%. The second zone B, which is between and adjacent to zones A and C, has a medium reflection/transmission ratio, for example a reflection of 50% and a transmission of 50%. The third zone C has a relatively low reflection/transmission ratio, for example a reflection of 25% and a transmission of 75% (or, in a further example described later, a transmission of 100%).

The provision of these zones enables a more uniform brightness across the image as viewed by the observer to be achieved. The effect can be appreciated by consideration of illustrative light paths shown in FIGS. 10 and 11.

A bundle of light, exemplified by the ray R1 in the left hand half of FIG. 10, emanating from the collimator lens 101 at a certain field angle enters through the input face 110 and strikes the face 124 to be totally reflected therefrom towards the interface 105 at a position in zone A. At the interface the ray is 25% transmitted as ray R2 and 75% reflected as ray R3 back towards the face 124. Ray R3 is totally reflected at face 125 and then strikes the interface 115 at a position in zone B. At the interface the ray is 50% reflected as ray R4 (having an intensity of 50%×75%=37.5% of the original ray R1) and 50% transmitted as ray R5 (also having an intensity of 50%×75%=37.5% of the original ray R1). The reflected ray R4 emerges through the output face 116, and the transmitted ray R5 is totally reflected from the face 114 to emerge through the output face 118. It will be seen that these emergent rays have an intensity of 37.5% of that of the original entrant ray R1; whereas if the interface where wholly 50% reflecting and 50% transmitting they would have an intensity of only 25% of that of the original entrant ray R1.

A further bundle of light, exemplified by the ray R6 in the right hand half of FIG. 10, emanating from the collimator lens 101 at a certain field angle enters through the input face 111 and strikes the face 125 to be totally reflected therefrom towards the interface 108 at a position in zone B. At the interface the ray is 50% reflected as ray R7 and 50% transmitted as ray R8. The transmitted ray R8 is totally reflected from the face 115 and then strikes the interface 108 at a position in zone C. At the interface the ray is 25% reflected as ray R9 and 75% transmitted as ray R10 (having an intensity of 75%×50%=37.5% of the original ray R6). The ray R10 emerges through the output face 117. Again it will be seen that this emergent ray has an intensity which is 37.5% of that of the original entrant ray R6, whereas if the interface were wholly 50% reflecting and 50% transmitting it would have an intensity of only 25% of the original entrant ray R6. The reflected ray R9 is totally reflected from the face 115 to emerge through the output face 119 (at an intensity of 12.5% of that of the original ray R6).

The above described light paths are illustrative, there being numerous further paths involving multiple reflections and transmissions. However, it has been found in practice that with zoned interfaces as described above a more even level of image brightness (for example approximating to about 38% of the image brightness that would be seen by looking directly into the collimator lens 101) can be achieved than with interfaces which are wholly 50% reflecting and 50% transmitting. Such more uniform brightness across the image gives a considerable improvement in picture quality to an observer. The optimum lengths of the respective zones, i.e. the distance over which the zone A extends from the input face and the distance over which zone C extends from the output face, can be determined by an iterative procedure of ray tracing and/or practical experiment. In one particular example with a total interface length of 26.39 mm the zone A extends over 2.93 mm and the zone C extends over 3.39 mm, zone B therefore extending over 20.07 mm. In this example the prisms had basic rhomboid angles of 36° 45' and 143° 15' (the angle between the faces 112 and 113 and the respective interfaces 105 and 108 being 53° 15') and the inner faces 124 and 125 of the inner prisms 103 and 106 were spaced from the respective interfaces 105 and 108 at a (perpendicular) distance of 6.6 mm, while the outer faces 114 and 115 of the outer prisms 104 and 107 were spaced from the respective interfaces 105 and 108 at a (perpendicular) distance of 9.1 mm.

The greater spacing between the outer faces 114 and 115 and the respective interfaces 105 and 108 then between the inner faces 124 and 125 and the respective interfaces 105 and 108 assists in the achievement of more uniform brightness in the image and also improves the eye relief at which the full width and height of the more evenly illuminated field of view can be seen. Such greater spacing, which may for example be by a factor of up to about 50%, is achieved by making the outer prisms 104 and 107 wider than the inner prisms 103 and 106. Additionally, the inner prisms 103 and 106 may be thicker than the outer prisms 104 and 107 (i.e. the outer prisms 104 and 107 may have a dimension perpendicular to the plane of FIGS. 9 and 10 less than that of the inner prisms 103 and 106). Such greater thickness of the inner prisms can give an increased vertical field of view to the observer and the lesser thickness of the outer prisms reduces the weight of the apparatus relative to an arrangement in which both the inner and outer prisms have the same greater thickness.

The effective extension of the outer prisms 104 and 107 beyond the true rhomboid form so as to increase the length of their outer faces 114 and 115 in a direction towards the lens 101 as described above enables light rays, such as the ray R2 in FIG. 10, which are transmitted through zone A of the interfaces to be reflected back from the respective face 114 or 115 and not lost. This is illustrated in FIG. 11, which corresponds to the right hand half of FIG. 10. A ray R11 entering through the input face 111 is totally reflected from the face 125 to strike the interface 108 at a position in zone A. At the interface the ray is 75% reflected as ray R12 and 25% transmitted as ray R13. The transmitted ray R13 is totally reflected from the face 115 to strike the interface 108 at a position in zone B at which it is 50% reflected as ray R14 and 50% transmitted as ray R15. The transmitted ray R15 (having an intensity of 25%×50%=12.5% of the original entrant ray R11) emerges through the output face 117. FIG. 11 also shows an entrant ray R16 parallel to the entrant ray R11. This ray R16 enters through the input face 111 and is totally reflected from the face 125 to strike the interface 108 at a position in zone B. At the interface the ray is 50% transmitted as ray R17 and 50% reflected as ray R18. The reflected ray R18 is totally reflected from the face 125 and strikes the interface 108 again at a position in zone B (and at essentially the same position as the ray R13 strikes the interface). At the interface ray R18 is 50% transmitted as ray R19 and 50% reflected as ray R20. The reflected ray R20 (having an intensity of 50%×50%=25% of the original entrant ray R16) emerges through the output face 117 coincident with the ray R15 (the respective rays being shown in spaced parallel relationship in FIG. 11 for purposes of identification and explanation). Thus, the combined emergent rays R15 and R20 have a combined intensity of 12.5%+25%=37.5% of the intensity of each of the original entrant rays R11 and R16. FIG. 11 thus illustrates that the light paths through the prisms include paths by which parallel entrant rays are effectively combined to produce a common output ray which assists in the achievement of a more uniform image brightness.

The interfaces 105 and 108 are given the required partially transmitting/partially reflecting characteristics by applying a coating to one of the faces at the interface before these faces are cemented together. In particular the coatings may be applied to the inner faces of the outer prisms 104 and 107. The different reflection/transmission ratios over the respective zones A, B and C can be achieved by multiple coating operations so as to provide different coatings, and/or different coating thicknesses, over the respective zones. This will normally involve the use of three precision coating jigs which tends to render the operation expensive and time consuming.

More conveniently, therefore, the zoned reflection/transmission characteristics may be achieved by a single coating operation employing a mask having apertures which define different masked to open area ratios over the different zones so that the respective zones after coating have corresponding different coated to clear area ratios giving an integrated effect over the eye pupil which provides the required reflection/transmission ratios.

For example, the mask may have apertures in the form of bands at different spacings and/or of different widths in the different zones to produce corresponding coated bands at different spacings and/or of different widths on the face. This is illustrated in principle in FIG. 12 which shows coated bands 126 which are more closely spaced in zone A than in zone B, and more closely spaced in zone B than in zone C. If the coating is such that the actual coated areas (i.e. the bands 126) are totally reflecting, then the small spacing between the bands 26 in zone A is such as to give an integrated reflection/transmission ration of 75% reflection and 25% transmission. The medium spacing between the bands 126 in zone b gives an integrated reflection/transmission ratio of 50% reflection and 50% transmission. The larger spacing between the bands 126 in zone C gives an integrated reflection/transmission ratio of 25% reflection and 75% transmission.

It will be appreciated that the bands 126 may be all of the same width, as shown, and at different spaces in zones A, B and C, or may alternatively be of different widths in zones A, B and C and at the same spacing, to give the required coated to clear area ratios in the respective zones. It will be understood that in FIG. 12 the band and spacing width is greatly exaggerated for purposes of illustration. It will also be understood that if desired the coating may be such as to impart to the coated areas a 75% reflection and 25% transmission, in which case zone A may be wholly coated and zones B and C given banded coatings at suitable different band width to spacing ratios to impart the required reflection/transmission ratios.

Coated areas in the form of bands are shown in FIG. 12 and described above for the purpose of illustrating the principle. However, bands can give rise to undesirable diffraction effects and it is therefore preferable that, instead of bands, the coated areas should take the form of shapes, which may conveniently be circles, which are disposed in a random or irregular distribution. FIG. 13 shows part of a face having randomly distributed coated circular areas 127 achieved by coating through a mask having correspondingly distributed circular apertures. For each respective zone the coated to uncoated area ratio is such as to achieve the required integrated reflection/transmission ratio. Thus, for example, if the coated areas have a 75% reflection and a 25% transmission zone A can be wholly coated and zones B and C partially coated over randomly distributed circular areas 127, the distribution in zone B being such as to achieve a coated to uncoated area ratio giving an overall 50% reflection and 50% transmission, and the distribution in zone C being such as to achieve a coated to uncoated area ratio giving an overall 25% reflection and 75% transmission.

It will be appreciated that alternatively a two stage coating treatment could be employed. In one, for example the first, stage zone A can be wholly coated with a coating which imparts a 75% reflection and a 25% transmission, zones B and C being totally masked so that no coating is applied thereto in this first stage. Then, for the second stage, zone A is totally masked and zone C is partially masked and a coating which imparts a 50% reflection and a 50% transmission is applied. Zone B is wholly coated in this second stage while zone C is partially coated, the distribution of coated areas in zone C being such as to achieve a coated to uncoated area ratio giving the required integrated 25% reflection and 75% transmission.

In a further arrangement in accordance with the invention zone C of the interfaces 105 and 108 is uncoated so as to effect substantially 100% transmission, zones A and B respectively effecting 75% reflection/25% transmission and 50% reflection/50% transmission as previously described. The passage of light rays through the prisms is essentially the same as set forth above except that a ray R8 (FIG. 10) striking the interface in zone C is totally transmitted therethrough instead of being partially reflected as ray R9. Since, with this arrangement, reflections from zone C do not occur, the chamfers 200 and 211 can be made larger because the outer reflecting faces 114 and 115 need only extend a sufficient distance to ensure that they receive rays reflected from the end of zone B adjacent zone C.

An interface in accordance with this further arrangement, i.e. with zone C totally transmitting, can be produced by a single coating operation, zone A being wholly coated with a coating which gives 75% reflection and 25% transmission, zone B being partially coated by use of a mask described above so that the coated areas effect 75% reflection and 25% transmission but the ratio of coated to uncoated areas is such as to effect overall 50% reflection and 50% transmission, and zone C being wholly masked so that no coating is applied thereto. However, a two stage coating operation such that zones A and B are both wholly coated, but with respective coatings which impart the required different trasmission/reflection ratios, could be employed if desired, zone C again remaining wholly uncoated.

In one particular example with a total interface length of 25.86 mm zone A extends over 2.52 mm, zone B over 21.11 mm, and uncoated zone C over 2.23 mm. In this example the prisms had basic rhomboid angles of 38° and 142° (the angle between the faces 112 and 113 ad the respective interfaces 105 and 108 being 52°) and the inner faces 124 and 125 were spaced from the respective interfaces 105 and 108 at a (perpendicular) distance of 6.78 mm, while the outer faces 114 and 115 were spaced from the respective interfaces 105 and 108 at a (perpendicular) distance of 8.40 mm.

It will be appreciated that, although the provision of discrete zones A, B and C having different reflection/transmission ratios is preferable, the interfaces 105 and 108 could have a graded reflection/transmission characteristic which progressively changes from a relatively high reflection/transmission ratio at the end of the interface adjacent the input face to a relatively low reflection/transmission ratio at the end of the interface adjacent the output face. This can be achieved, for example, by using a mask which provides coated bands of the same width at progressively increasing spacings (or bands of progressively decreasing widths at the same spacing) from the input end of the interface to its output end. Preferably, however, as indicated above the mask should provide coated shapes other than bands, such as circles, which are randomly or irregularly distributed to minimise diffraction effect problems, the coated to uncoated area ratio progressively decreasing from the input end of the interface to its output end.

It will be understood that the concept of providing different reflection/transmission ratios over different parts of the interfaces to improve the uniformity of image brightness as specifically described above in relation to a preferred embodiment (which corresponds basically to the embodiment shown in FIG. 4B) can also advantageously be applied to other embodiments, (and in particular the other embodiments specifically disclosed herein).

FIG. 14 illustrates a modification of the embodiment shown in FIG. 9 which allows for convergence of the observer's eyes. The plano-concave lenses 122 and 123, instead of being cemented directly to the respective output faces 116/118 and 177/119, are cemented to wedge shaped prisms which are cemented to the output faces. FIG. 14 shows this in relation to the right hand lens 123 whose planar face is cemented to a face of a wedge shaped or triangular prism 128 interposed between the lens and the output face 117/119 to which the prism 128 is cemented.

The apex 129 of the triangular prism 128 faces towards the optical axis O and the prism has the effect of refracting output light rays so that the line of sight from the observer's eye converges in a direction away from the observer towards the optical axis. A similar triangular prism is interposed between and cemented to the left hand lens 122 and the output face 116/118 so that the lines of sight from the observer's respective eyes converge. This accommodates the natural tendency of the observer's eye muscles to cause the eyes to converge when simultaneously viewing an image with both eyes.

As shown in the drawings, the reflecting faces 9 and 10 in FIG. 1, 23 and 24 in FIG. 2, and 114 and 115 in FIG. 9 diverge in a direction away from the lens to a spacing between the reflecting faces at their output ends greater than the diameter of the lens.

What we claim is:

1. Optical apparatus for biocular viewing comprising a collimating magnifier lens for producing a magnified image of an object to be viewed and having an optical axis, and means positioned to receive light from the lens and providing a pair of partially transmitting/partially reflecting interfaces between solid parts, the interfaces being disposed respectively on opposite sides of and inclined relative to the optical axis so as to converge in a direction towards the lens, and further providing a pair of reflecting faces located respectively on opposite sides of the optical axis and each positioned further from the optical axis than the partially transmitting/partially reflecting interfaces on that side, each said reflecting face being parallel to the partially transmitting/partially reflecting interface on the same side of the optical axis and disposed so as to reflect rays of light received from the lens via the partially transmitting/partially reflecting interface towards an observer in parallel relationship with rays of light received from the lens and travelling from the partially transmitting/partially reflecting interface towards the observer thereby to provide on each side of the optical axis plural light paths by which said image can be viewed.

2. Apparatus according to claim 1 wherein said reflecting faces have a totally reflective coating.

3. Apparatus according to claim 1 wherein the partially transmitting/partially reflecting interfaces have a coating of suitable transmission/reflection characteristics.

4. Apparatus according to claim 1 wherein the said means positioned to receive light from the lens comprising at least one pair of basically rhomboidal prisms.

5. Apparatus according to claim 1 wherein each of the said partially transmitting/partially reflecting interfaces has different transmission/reflection characteristics over different zones of the interface.

6. Apparatus according to claim 1 wherein each of said interfaces has a higher reflection/transmission ratio at a part of the interface located towards said collimating magnifier lens than at a pair of the interface located when in use towards the observer.

7. Apparatus according to claim 1 wherein said means providing said interfaces and said reflecting faces has an input face, through which light from the lens enters, and an output face, through which light emerges, and each said interface has a higher reflection/transmission ratio over a part located towards said input face than over a part located towards said output face.

8. Apparatus according to claim 5 wherein each said interface has three zones of different reflection/transission characteristics.

9. Apparatus according to claim 1 wherein said means providing said interfaces and said reflecting faces has an input face, through which light from the lens enters, and an out put face, through which light emerges, and each said interface has a first zone located towards said input face and having a relatively high reflection/transmission ratio, a second zone located adjacent said first zone and having a medium reflection/transmission ratio, and a third zone located adjacent said second zone and towards said output face and having a relatively low reflection/transmission ratio.

10. Apparatus according to claim 1 wherein each said interface has a first zone which effects about 75% reflection and 25% transmission, a second zone which effects about 50% reflection and 50% transmission, and a third zone which effects about 25% reflection and 75% transmission.

11. Apparatus according to claim 1 wherein each said interface has a first zone which effects about 75% reflection and 25% transmission, and a second zone which effects about 50% reflection and 50% transmission, and a third zone which effects about 100% transmission.

12. Apparatus according to claim 5 wherein said different reflection/transmission characteristics of said different zones of each said interface are provided by different clear to coated area ratios over the respective zones.

13. Apparatus according to claim 5 wherein said different reflection/transmission characteristics of said different zones of each said interface are provided by different clear to coated area ratios over the respective zones and wherein said different clear to coated area ratios are provided by a coating operation employing a mask having an arrangement of apertures defining different areas over which coating material is applied.

14. Apparatus according to claim 5 wherein said different reflection/transmission characteristics of said different zones of each said interface are provided by different clear to coated area ratios over the respective zones and wherein the coated areas in a respective zone take the form of bands.

15. Apparatus according to claim 5 wherein said different reflection/transmission characteristics of said different zones of each said interface are provided by different clear to coated area ratios over the respective zones and wherein the coated areas take the form of shapes which are irregularly distributed in the respective zone.

16. Apparatus according to claim 5 wherein said different reflection/transmission characteristics of said different zones of each said interface are provided by different clear to coated area ratios over the respective zones and wherein at least one zone of each said interface is wholly coated.

17. Apparatus according to claim 1 including two reflecting faces on each side of the optical axis, the respective interface being positioned between and parallel to the reflecting faces on that side.

18. Apparatus according to claim 17 wherein on each side of the optical axis the spacing between the interface and the reflecting face furthest from the optical axis is greater than that between the interface and the reflecting face nearest the optical axis.

19. Apparatus according to claim 17 wherein the reflecting faces furthest from the optical axis extend in a direction towards the lens beyond a plane orthogonal to the optical axis and intersecting the ends of the interfaces closest to the lens.

20. Apparatus according to claim 1 including two reflecting faces on each side of the optical axis, the respective interface being positioned between and parallel to the reflecting faces on that side, wherein on each side of the optical axis the spacing between the interface and the reflecting face furthest from the optical axis is greater than that between the interface and the reflecting face nearest the optical axis and wherein the reflecting faces furthest from the optical axis extend in a direction towards the lens beyond a plane orthogonal to the optical axis and intersecting the ends of the interfaces closest to the lens.

21. Apparatus according to claim 4 wherein said means comprises two pairs of basically rhomboidal prisms disposed with two prisms to one side and two to the other side of the optical axis, the two prisms on each side being cemented together and the cemented interfaces providing said partially transmitting/partially reflecting interfaces, the inner face of the inner prisms (i.e. the faces closest to the optical axis) and the outer faces of the outer prisms (i.e. the faces furthest from the optical axis) being totally internally reflecting and providing said reflecting faces, and wherein the end faces closest to the lens of the inner prisms are in coplanar disposition orthogonal to the optical axis and provide input faces through which light from the lens enters the prisms.

22. Apparatus according to claim 21 wherein the end faces closest to the lens of the outer prisms are inclined relatively to said input faces so that the outer faces of the outer prisms extend in a direction towards the lens beyond the plane of said input faces.

23. Apparatus according to claim 21 wherein the outer prisms have chamferred acute apex corners furthest from the optical axis.

24. Apparatus according to claim 21 wherein the inner prisms have a width dimension orthogonal to the optical axis less than that of the outer prisms.

25. Apparatus according to claim 21 wherein the end faces furthest from the lens of the inner and outer prisms are disposed in coplanar relationship orthogonal to the optical axis and provide output faces through which light emerges.

26. Apparatus according to claim 21 wherein the end faces furthest from the lens of the inner and outer prisms are disposed in coplanar relationship orthogonal to the optical axis and provide output faces through which light emerges and comprising plano-concave lenses associated with the respective said output faces on each side of the optical axes and wherein said plano-concave lenses are cemented to the respective output faces.

27. Apparatus according to claim 21 wherein the end faces furthest from the lens of the inner and outer prisms are disposed in coplanar relationship orthogonal to the optical axis and provide output faces through which light emerges and comprising plano-concave lenses associated with the respective said output faces on each side of the optical axes and wherein said plano-concave lenses are cemented to wedge shaped prisms which are cemented to the respective output faces.

28. Apparatus according to claim 1 wherein said means positioned to receive light from the lens comprises at least one pair of basically rhomboidal prisms disposed respectively on opposite sides of the optical axis and a triangular prism between the rhomboidal prisms, the interfaces between the triangular prism and the inner faces of the rhomboidal prisms being partially transmitting/partially reflecting.

29. Apparatus according to claim 4 comprising two pairs of basically rhomboidal prisms disposed to locate two prisms to one side and two to the other side of the optical axis, the two prisms on each side of the optical axis being cemented together and the cemented interfaces being partially transmitting/partially reflecting.

30. Apparatus according to claim 4 comprising two pairs of basically rhomboidal prisms disposed to locate two prisms to one side and two to the other side of the optical axis, the two prisms on each side of the optical axis being cemented together and the cemented interfaces being partially transmitting/partially reflecting and wherein the outer prisms have outer faces (furthest from the optical axis) which are totally internally reflecting.

31. Apparatus according to claim 4 comprising two pairs of basically rhomboidal prisms disposed to locate two prisms to one side and two to the other side of the optical axis, the two prisms on each side of the optical axis being cemented together and the cemented interfaces being partially transmitting/partially reflecting and wherein the inner prisms have inner faces (closest to the optical axis) which are totally internally reflecting.

32. Apparatus according to claim 4 comprising two pairs of basically rhomboidal prisms disposed to locate two prisms to one side and two to the other side of the optical axis, the two prisms on each side of the optical axis being cemented together and the cemented interfaces being partially transmitting/partially reflecting and further comprising a triangular prism disposed between the inner basically rhomboidal prisms, the interfaces between the triangular prism and said inner prisms being partially transmitting/partially reflecting.

33. Apparatus according to claim 28 comprising a mask disposed along the optical axis centrally of the triangular prism.

34. Apparatus according to claim 4 wherein adjacent basically rhomboidal prisms on opposite sides of the optical axis are disposed with acute apexes nominally touching the optical axis.

35. Apparatus according to claim 4 wherein adjacent basically rhomboidal prisms on opposite sides of the optical axis have chamferred acute apexes and the prisms are disposed with the chamfers nominally touching the optical axis.

36. Apparatus according to claim 4 wherein adjacent basically rhomboidal prisms on opposite sides of the optical axis have faces facing the lens which lie in the same plane.

37. Apparatus according to claim 4 comprising plano-concave lenses associated with the output faces of the basically rhomboidal prisms.

38. Apparatus according to claim 4 wherein the non-used faces of the basically rhomboidal prisms are ground and blackened.

39. Apparatus according to claim 1 including means to bend the light path through the collimating magnifier lens.

40. Apparatus according to claim 39 wherein the means to bend the light path comprises a light bending prism disposed in the light path between lens components of the collimating magnifier lens and arranged to produce at least one bend in the light path through the lens.

41. Optical apparatus for biocular viewing comprising a collimating magnifier lens for producing a magnified image of an object to be viewed and having an optical axis, and means positioned to receive light from the lens and providing a pair of inner reflecting faces disposed respectively on opposite sides of and inclined relatively to the optical axis so as to converge in a direction towards the lens, a pair of outer reflecting faces disposed respectively on opposite sides of the optical axis further therefrom than said inner reflecting faces and each parallel to the inner reflecting face on the same side of the optical axis, and a pair of partially transmitting/partially reflecting interfaces disposed respectively on opposite sides of the optical axis, each said interface being positioned between and parallel to the inner and outer reflecting faces on the same side of the optical axis.

42. Apparatus according to claim 41 wherein said outer reflecting faces are totally reflecting.

43. Apparatus according to claim 42 wherein said inner reflecting faces are totally reflecting.

44. Apparatus according to claim 41 wherein each of said partially transmitting/partially reflecting interfaces has different transmission/reflection characteristics over different parts of the interface.

45. Optical apparatus for biocular viewing comprising a collimating magnifier lens for producing a magnified image of an object to be viewed and having an optical axis, and means positioned to receive light from the lens and providing a pair of partially transmitting/partially reflecting interfaces between solid parts, the interfaces being disposed respectively on opposite sides of and inclined relative to the optical axis so as to converge in a direction towards the lens, and further providing a pair of reflecting faces located respectively on opposite sides of the optical axis and diverging in a direction away from the lens to a spacing between said reflecting faces greater than the diameter of the lens, each said reflecting face being positioned further from the optical axis than and disposed parallel to the partially transmitting/partially reflecting interface on the same side of the optical axis.

* * * * *

UNITED STATES PATENT AND TRADEMARK OFFICE
CERTIFICATE OF CORRECTION

PATENT NO. : 4,178,072

DATED : December 11, 1979

INVENTOR(S) : Philip J. Rogers

It is certified that error appears in the above-identified patent and that said Letters Patent is hereby corrected as shown below:

Col. 8, line 6, delete "views" and substitute therefor --view--.

Col. 8, line 63, delete "axix" and substitute therefor --axis--

Col. 9, line 68, delete "125" and substitute therefor --124--.

Col. 10, line 65, delete "then" and substitute therefor --than--.

Col. 12, line 24, delete "ration" and substitute therefor --ratio--.

Col. 12, line 26, delete "zone b" and substitute therefor --zone B--.

UNITED STATES PATENT AND TRADEMARK OFFICE
CERTIFICATE OF CORRECTION

PATENT NO. : 4,178,072
DATED : December 11, 1979
INVENTOR(S) : Philip J. Rogers

It is certified that error appears in the above-identified patent and that said Letters Patent are hereby corrected as shown below:

Col. 13, line 48, delete "ad" and substitute therefor --and--.

Col. 15, lines 6-7, delete "comprising" and substitute therefor --comprises--.

Col. 15, line 15, delete "pair" and substitute therefor --part--.

Signed and Sealed this

Eighteenth Day of June 1985

[SEAL]

Attest:

DONALD J. QUIGG

Attesting Officer

Acting Commissioner of Patents and Trademarks